United States Patent
Glover

(10) Patent No.: US 10,832,082 B2
(45) Date of Patent: Nov. 10, 2020

(54) TEMPLATE SELECTION SYSTEM AND METHOD

(71) Applicant: International Business Machines Corporation, Armonk, NY (US)

(72) Inventor: Raymond Glover, Saffron Walden (GB)

(73) Assignee: International Business Machines Corporation, Armonk, NY (US)

( * ) Notice: Subject to any disclaimer, the term of this patent is extended or adjusted under 35 U.S.C. 154(b) by 78 days.

(21) Appl. No.: 15/812,079

(22) Filed: Nov. 14, 2017

(65) Prior Publication Data

US 2019/0147289 A1    May 16, 2019

(51) Int. Cl.
| | | |
|---|---|---|
| G06K 9/00 | (2006.01) | |
| G06K 9/62 | (2006.01) | |
| G06F 16/583 | (2019.01) | |
| G06K 9/78 | (2006.01) | |

(52) U.S. Cl.
CPC ......... G06K 9/6202 (2013.01); G06F 16/583 (2019.01); G06F 16/5838 (2019.01); G06K 9/78 (2013.01)

(58) Field of Classification Search
None
See application file for complete search history.

(56) References Cited

U.S. PATENT DOCUMENTS

| | | | | |
|---|---|---|---|---|
| 9,349,076 B1 * | 5/2016 | Liu | .................... | G06K 9/6256 |
| 9,589,179 B2 * | 3/2017 | Nielsen | ............ | G08B 13/19602 |
| 9,922,271 B2 * | 3/2018 | Kant | ..................... | G06K 9/6277 |
| 2011/0138187 A1 * | 6/2011 | Kaga | ........................ | G06F 21/32 |
| | | | | 713/186 |
| 2016/0063300 A1 | 3/2016 | Du et al. | | |
| 2016/0086030 A1 | 3/2016 | Gottemukkula et al. | | |
| 2016/0132711 A1 * | 5/2016 | Setterberg | .......... | G06K 9/00926 |
| | | | | 382/124 |
| 2017/0220887 A1 * | 8/2017 | Fathi | .................. | G06K 9/00201 |

FOREIGN PATENT DOCUMENTS

| | | |
|---|---|---|
| EP | 1825374 A4 | 8/2007 |
| WO | 2016202824 A1 | 12/2016 |

OTHER PUBLICATIONS

Jain et al., "Biometric Template Selection: A Case Study in Fingerprints," Proc. of 4th Int'l Conference on Audio and Video-Based Person Authentication (AVBPA), LNCS 2688, Guildford, UK, Jun. 9-11, 2003, pp. 335-342.

(Continued)

*Primary Examiner* — Delomia L Gilliard
(74) *Attorney, Agent, or Firm* — Reza Sarbakhsh

(57) ABSTRACT

A method, computer program product, and computing system for receiving a plurality of images of a subject. The plurality of images of the subject may be processed to generate one or more templates. At least one template of the plurality of templates may be verified against at least one other template of the plurality of templates based upon, at least in part, a template quality threshold. A verified subset of templates may be generated including the at least one template that verifies each template of the plurality of templates.

20 Claims, 8 Drawing Sheets

(56) References Cited

OTHER PUBLICATIONS

2016 Kennis Research, "Receiver Operating Characteristic (ROC) Curves," (https://kennis-research.com/), https://kennis-research.shinyapps.io/ROC-Curves/ downloaded Aug. 22, 2017, pp. 1-4.
Ryu et al, "Super-Template Generation using Successive Bayesian Estimation for Fingerprint Enrollment," School of Information & Communication Engineering, Inha University Biometrics Engineering Research Center, Korea, Chapter in Lecture Notes in Computer Science, Jan. 1970, downloaded on Aug. 22, 2017, pp. 710-719.
Chen et al., "Face Recognition Based on Multi-Class Mapping of Fisher Scores," Department of Electrical and Computer Engineering, Stevens Institute of Technology, Pattern Recognition 38 (2005), pp. 799-811.
Wikipedia, "Receiver Operating Characteristic," https://en.wikipedia.org/wiki/Receiver_operating_characteristic, downloaded on Aug. 22, 2017, pp. 1-7.

\* cited by examiner

600

TEMPLATE SELECTION SYSTEM AND METHOD

BACKGROUND

Images, such as biometrics, may be recorded and used to identify or verify subjects. However, poor image quality may prevent visual identification systems from identifying subjects. For example, poor image quality may occur because of poor lighting, poor resolution, poor sharpness, high noise level, poor range of angles, and/or poor orientation of the subject in the image. As such, visual identification systems may not be sufficiently robust to identify subjects in various challenging environments.

BRIEF SUMMARY OF DISCLOSURE

In one example implementation, a computer-implemented method is executed on a computing device and may include but is not limited to receiving, at the computing device, a plurality of images of a subject. The plurality of images of the subject may be processed to generate a plurality of templates. At least one template of the plurality of templates may be verified against at least one other template of the plurality of templates based upon, at least in part, a template quality threshold. A verified subset of templates may be generated including the at least one template that verifies each template of the plurality of templates.

One or more of the following example features may be included. Verifying the at least one template of the plurality of templates against at least one other template of the plurality of templates may include determining a match score associated with the at least one template of the plurality of templates and the at least one other template of the plurality of templates. Generating the verified subset of templates may include adding one or more templates to the verified subset of templates based upon, at least in part, the match score associated with the at least one template of the plurality of templates and the at least one other template and the template quality threshold. Generating the verified subset of templates may be based upon, at least in part, a minimum template quality threshold. The computer-implemented method may also include comparing the verified subset of templates to at least one database template. Comparing the verified subset of templates to at least one database template may include comparing the verified subset of templates to at least one database template to identify the subject in the plurality of images of the subject from a plurality of subjects identified in the at least one database template. Comparing the verified subset of templates to at least one database template may include comparing the verified subset of templates to at least one database template to verify whether the subject in the plurality of images of the subject is the subject identified in the at least one database template.

In another example implementation, a computer program product resides on a computer readable medium that has a plurality of instructions stored on it. When executed across one or more processors, the plurality of instructions cause at least a portion of the one or more processors to perform operations that may include but are not limited to receiving, at the computing device, a plurality of images of a subject. The plurality of images of the subject may be processed to generate a plurality of templates. At least one template of the plurality of templates may be verified against at least one other template of the plurality of templates based upon, at least in part, a template quality threshold. A verified subset of templates may be generated including the at least one template that verifies each template of the plurality of templates.

One or more of the following example features may be included. Verifying the at least one template of the plurality of templates against at least one other template of the plurality of templates may include determining a match score associated with the at least one template of the plurality of templates and the at least one other template of the plurality of templates. Generating the verified subset of templates may include adding one or more templates to the verified subset of templates based upon, at least in part, the match score associated with the at least one template of the plurality of templates and the at least one other template and the template quality threshold. Generating the verified subset of templates may be based upon, at least in part, a minimum template quality threshold. Operations of at least a portion of the one or more processors may include comparing the verified subset of templates to at least one database template. Comparing the verified subset of templates to at least one database template may include comparing the verified subset of templates to at least one database template to identify the subject in the plurality of images of the subject from a plurality of subjects identified in the at least one database template. Comparing the verified subset of templates to at least one database template may include comparing the verified subset of templates to at least one database template to verify whether the subject in the plurality of images of the subject is the subject identified in the at least one database template.

In another example implementation, a computing system comprising one or more processors and one or more memories, wherein the computing system is configured to perform operations that may include but are not limited to receiving, at the computing device, a plurality of images of a subject. The plurality of images of the subject may be processed to generate a plurality of templates. At least one template of the plurality of templates may be verified against at least one other template of the plurality of templates based upon, at least in part, a template quality threshold. A verified subset of templates may be generated including the at least one template that verifies each template of the plurality of templates.

One or more of the following example features may be included. Verifying the at least one template of the plurality of templates against at least one other template of the plurality of templates may include determining a match score associated with the at least one template of the plurality of templates and the at least one other template of the plurality of templates. Generating the verified subset of templates may include adding one or more templates to the verified subset of templates based upon, at least in part, the match score associated with the at least one template of the plurality of templates and the at least one other template and the template quality threshold. Generating the verified subset of templates may be based upon, at least in part, a minimum template quality threshold. Operations of the computing system may include comparing the verified subset of templates to at least one database template. Comparing the verified subset of templates to at least one database template may include comparing the verified subset of templates to at least one database template to identify the subject in the plurality of images of the subject from a plurality of subjects identified in the at least one database template. Comparing the verified subset of templates to at least one database template may include comparing the verified subset of templates to at least one database template to verify whether the subject in the plurality of images of the subject is the subject identified in the at least one database template.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
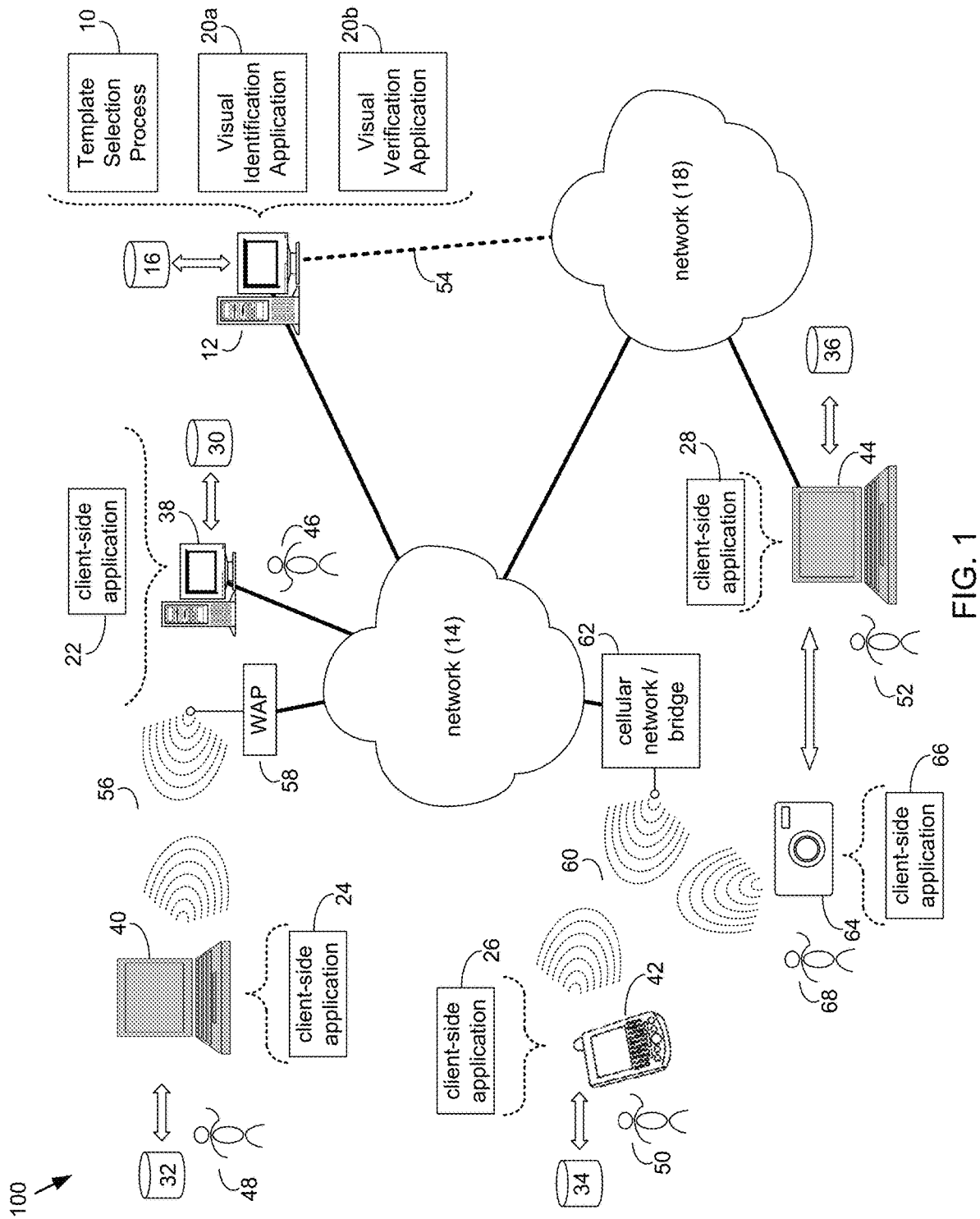
FIG. 1 is an example diagrammatic view of template selection process coupled to a distributed computing network according to one or more example implementations of the disclosure.
Figure 2:
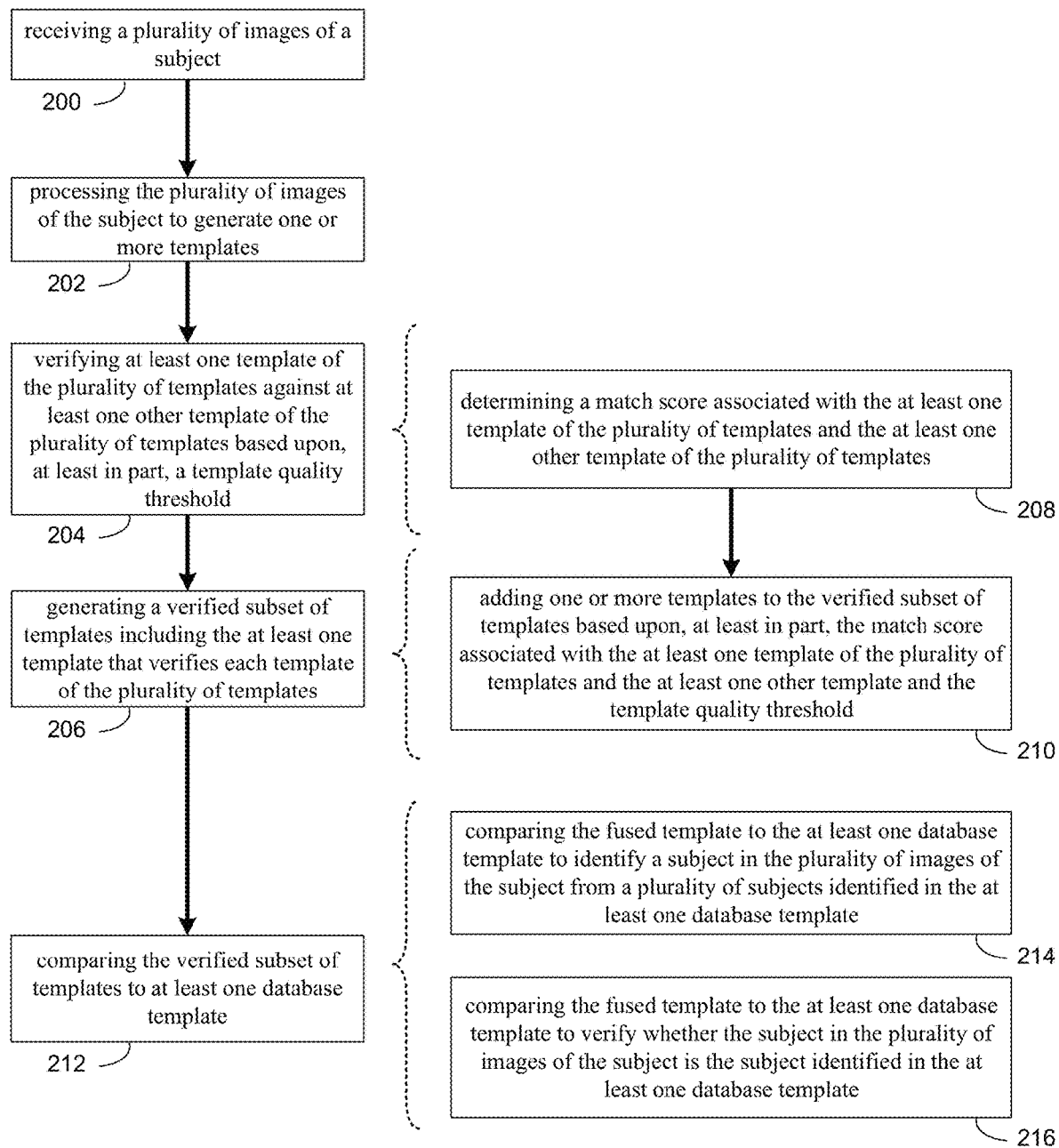
FIG. 2 is an example flowchart of the template selection process of FIG. 1 according to one or more example implementations of the disclosure.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to FIG. 1, there is shown template selection process 10 that may reside on and may be executed by a computing device 12, which may be connected to a network (e.g., network 14) (e.g., the internet or a local area network). Examples of computing device 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computing device 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, a template selection process, such as template selection process 10 of FIG. 1, may receive a plurality of images of a subject. The plurality of images of the subject may be processed to generate a plurality of templates. Template selection process 10 may verify at least one template of the plurality of templates against at least one other template of the plurality of templates based upon, at least in part, a template quality threshold. A verified subset of templates may be generated including the at least one template that verifies each template of the plurality of templates.

The instruction sets and subroutines of template selection process 10, which may be stored on storage device 16 coupled to computing device 12, may be executed by one or more processors (not shown) and one or more memory architectures (not shown) included within computing device 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Template selection process 10 may be a stand-alone application that interfaces with an applet/application that is accessed via client applications 22, 24, 26, 28. In some embodiments, template selection process 10 may be, in whole or in part, distributed in a cloud computing topology. In this way, computing device 12 and storage device 16 may refer to multiple devices, which may also be distributed throughout network 14 and/or network 18.

Computing device 12 may execute a visual identification application (e.g., visual identification application 20a), examples of which may include, but are not limited to, applications that process images to determine the identity of a subject in the image based upon a plurality of database templates. Additionally, Computing device 12 may execute a visual verification application (e.g., visual verification application 20b), examples of which may include, but are not limited to, applications that process images to verify if a subject in an image is a subject defined in at least one database template. Template selection process 10 and/or visual identification application 20a and/or visual verification application 20b may be accessed via client applications 22, 24, 26, 28, 66. Template selection process 10 may be a stand-alone application, or may be an applet/application/script/extension that may interact with and/or be executed within visual identification application 20a and/or visual verification application 20b, a component of visual identification application 20a and/or visual verification application 20b, and/or one or more of client applications 22, 24, 26, 28, 66. Visual identification application 20a and/or visual verification application 20b may be a stand-alone application, or may be an applet/application/script/extension that may interact with and/or be executed within template selection process 10, a component of template selection process 10, and/or one or more of client applications 22, 24, 26, 28. One or more of client applications 22, 24, 26, 28 may be a stand-alone application, or may be an applet/application/script/extension that may interact with and/or be executed within and/or be a component of template selection process 10 and/or visual identification application 20a and/or visual verification application 20b. Examples of client applications 22, 24, 26, 28, 66 may include, but are not limited to, applications that receive queries to search for content from one or more databases, servers, cloud storage servers, etc., a textual and/or a graphical user interface, a customized web browser, a plugin, an Application Programming Interface (API), or a custom application. The instruction sets and subroutines of client applications 22, 24, 26, 28, 66 which may be stored on storage devices 30, 32, 34, 36, 802 coupled to client electronic devices 38, 40, 42, 44 and camera system 64, may be executed by one or more processors (not shown) and one or more memory architectures (not shown) incorporated into client electronic devices 38, 40, 42, 44.

Storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computing device 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Microsoft® Windows®; Mac® OS X®; Red Hat® Linux®, Windows® Mobile, Chrome OS, Blackberry OS, Fire OS, or a custom operating system.

One or more of client applications 22, 24, 26, 28, 66 may be configured to effectuate some or all of the functionality of template selection process 10 (and vice versa). Accordingly, template selection process 10 may be a purely server-side application, a purely client-side application, or a hybrid server-side/client-side application that is cooperatively executed by one or more of client applications 22, 24, 26, 28, 66 and/or template selection process 10.

One or more of client applications 22, 24, 26, 28, 66 may be configured to effectuate some or all of the functionality of visual identification application 20a and/or visual verification application 20b (and vice versa). Accordingly, search application 20 may be a purely server-side application, a purely client-side application, or a hybrid server-side/client-side application that is cooperatively executed by one or more of client applications 22, 24, 26, 28 and/or visual identification application 20a and/or visual verification application 20b. As one or more of client applications 22, 24, 26, 28, template selection process 10, and visual identification application 20a and/or visual verification application 20b, taken singly or in any combination, may effectuate some or all of the same functionality, any description of effectuating such functionality via one or more of client applications 22, 24, 26, 28, template selection process 10, visual identification application 20a, visual verification application 20b, or combination thereof, and any described interaction(s) between one or more of client applications 22, 24, 26, 28, 66 template selection process 10, visual identification application 20a, visual verification application 20b, or combination thereof to effectuate such functionality, should be taken as an example only and not to limit the scope of the disclosure.

Users 46, 48, 50, 52, 68 may access computing device 12 and template selection process 10 (e.g., using one or more of client electronic devices 38, 40, 42, 44 and/or camera system 64) directly or indirectly through network 14 or through secondary network 18. Further, computing device 12 may be connected to network 14 through secondary network 18, as illustrated with phantom link line 54. Template selection process 10 may include one or more user interfaces, such as browsers and textual or graphical user interfaces, through which users 46, 48, 50, 52 may access template selection process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 800.11a, 800.11b, 800.11g, Wi-Fi®, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14. Additionally, camera system 64 is shown wirelessly coupled to network 14 via wireless communication channel 60 established between camera system 64 and cellular network/bridge 62, which is shown directly coupled to network 14. Camera system 64 may be configured to be communicatively coupled to a client electronic device (e.g., client electronic device 44) to transmit and/or receive data to network 14 via client electronic device 44.

Some or all of the IEEE 800.11x specifications may use Ethernet protocol and carrier sense multiple access with collision avoidance (i.e., CSMA/CA) for path sharing. The various 800.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, a visual identification system may include one or more of a client electronic device (e.g., client electronic devices 38, 40, 42, 44 (and/or computing device 12)), a camera system (e.g., camera system 64), a network (e.g., network 14), template selection process 10, and/or a visual identification application (e.g., visual identification application 20a). In some implementations, a visual verification system may include one or more of a client electronic device (e.g., client electronic devices 38, 40, 42, 44 (and/or computing device 12)), a camera system (e.g., camera system 64), a network (e.g., network 14), template selection process 10, and/or a visual verification application (e.g., visual verification application 20b).

As discussed above and referring also at least to FIGS. 2-8, template selection process 10 may receive 200 a plurality of images of a subject. The plurality of images of the subject may be processed 202 to generate a plurality of templates. At least one template of the plurality of templates may be verified 204 against at least one other template of the plurality of templates based upon, at least in part, a template quality threshold. A verified subset of templates may be generated 206 including the at least one template that verifies each template of the plurality of templates.

As will be discussed in greater detail below, template selection process 10 may generally select a subset of templates which is most likely to result in the correct identification of the identity of the object and/or the correct verification of the identity of the object. In some implementations, template selection process 10 may take advantage of the "self-verification" properties of intra-track comparisons. That is, since an object in the track (i.e., plurality of images) is very likely to be of the same identity, template selection process 10 may confirm this through self-verification (e.g., verification of one or more templates against the plurality of templates and generating a verified subset of templates that verify each other). Additionally, template selection process 10 may distinguish between good and bad samples in the track. As will be discussed in greater detail below, template selection process 10 may result in fewer and/or faster database searches in visual identification and/or visual verification systems (e.g., biometric systems) and may make large deployments of visual identification and/or visual verification systems either feasible or more cost-effective.

As generally discussed above with reference to FIG. 2, template selection process 10 may receive 200 a plurality of images of a subject. In some implementations, an image may include a photograph. The image may be a digital representation displayed on a user interface and/or may be a physical photograph or a reproduction of a photograph. In some implementations, template selection process 10 may receive the plurality of images via a camera system (e.g., camera system 64). Camera system 64 may be configured to capture a video of a subject. A subject may generally include an object of known or unknown identity. In some implementations, the plurality of images may include a biometric identifier associated with a subject. In some implementations, the subject may be a biometric identifier. A biometric identifier may generally refer to physiological characteristics that are related to a shape or configuration of a body or portions of the body. Examples of biometric identifiers may generally include fingerprints, retina/iris, facial patterns, etc. In some implementations, the subject may include an object such as, for example, a road sign, a vehicle, a tattoo, and/or any object which may be photographed and/or visually captured in a video or photograph.

In some implementations, template selection process 10 may receive 200 a plurality of images by extracting the plurality of images from a video. In some implementations, template selection process 10 may receive a plurality of images that may or may not have been previously extracted from a video. For example, camera system 64 may capture a video of a subject (e.g., user 46). Template selection process 10 may extract a plurality of images of the subject (e.g., user 46) from the video captured by camera system 64. For example, the plurality of images from the video may include a plurality of individual frames of the video. In some implementations, camera system 64 may capture a plurality of images of the subject (e.g., user 46) and template selection process 10 may receive the plurality of images from camera system 64. In some implementations, a video of the subject may be received from a computing device (e.g., client electronic devices 38, 40, 42, 44 (and/or computing device 12)) and template selection process 10 may extract a plurality of images of the subject from the video received from a computing device. Additionally, a plurality of images of the subject (e.g., user 46) may be received from a computing device (e.g., client electronic devices 38, 40, 42, 44 (and/or computing device 12)).

In some implementations, the plurality of images may be received from a biometric scanning device. A biometric scanning device may generally include a scanning device configured to capture biometric identifiers from and associated with an individual or subject. Example biometric scanning devices may include a fingerprint scanner, a retinal scanner, an iris scanner, etc. coupled to and/or included within computing device 12 and/or camera system 64.

In some implementations, the received plurality of images may be referred to as a "track". A track may generally include a sequence of images of a subject. A "k-track" may refer to a track of "k" images, where "k" is the number of images.

In some implementations, the plurality of images extracted from a video or otherwise received by template selection process 10 may include one or more low quality images. A low quality image may be the result of one or more of low quality or non-ideal lighting, resolution, sharpness, noise level, range of angles or orientation of a subject, etc. As will be discussed in greater detail below, low quality images received by conventional object recognition systems may reduce the efficiency or even the possibility of identifying or verifying a subject in a plurality of images. In an illustrative example situation, the low quality images may reduce the efficiency and/or possibility of identifying or verifying the subject based upon any one of the individual images of the plurality of images.

In some implementations, the plurality of images may be received during an enrollment of a subject. For example, template selection process 10 may receive a plurality of images of a subject (e.g., user 46). The plurality of images of user 46 may be used to enroll the subject (e.g., user 46) in a database of images that may be used for identifying the subject from one or more known potential subjects or verifying the identity of the subject against one or more known subjects. For example, suppose camera system 64 captures a video of user 46. Further suppose that user 46's identity is known at the time camera system 46 captures the video of user 46. As will be discussed in greater detail below, template selection process 10 may enroll user 46 into a database of known subjects by generating a verified subset of templates associated with user 46.

Figure 3:
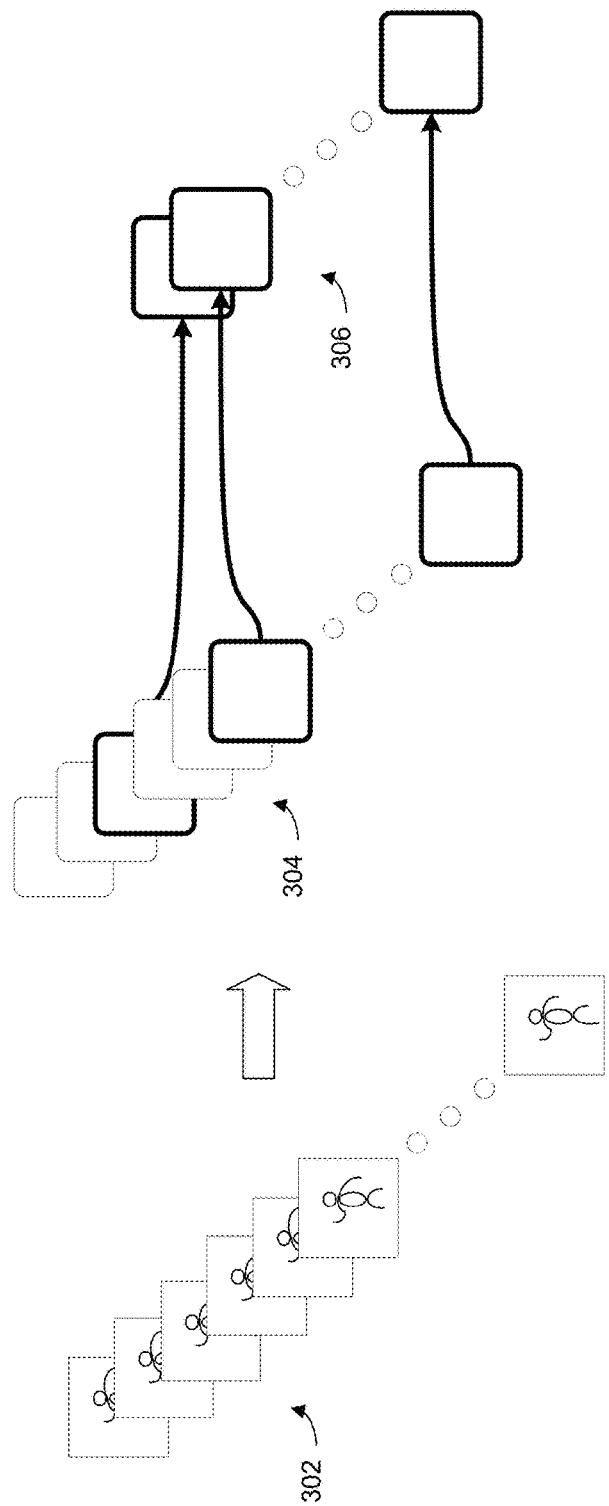
FIG. 3 is an example diagrammatic view of the processing of a plurality of images to generate a plurality of templates and the generation of a verified subset of templates according to one or more example implementations of the disclosure.

Referring also to FIG. 3 and in some implementations, template selection process 10 may process 202 the plurality of images of the subject to generate a plurality of templates. In some implementations, template selection process 10 may process a plurality of images (e.g., plurality of images 302) to generate a plurality of templates (e.g., plurality of templates 304). A template may generally include a representation of a subject that is generated by an object recognition system. Examples of object recognition systems may include, but are not limited to, neural networks. A neural network, or artificial neural network, may generally include a computing system that "learns" to do tasks by processing examples. In some implementations, a neural network is able to identify an image or a subject within an image by analyzing a plurality of example images or images of a particular subject that are pre-identified. From this "training" with pre-identified images, a neural network is able to generally identify a similar image and/or identify the subject within a different image.

In some implementations, template selection process 10 may process 202 the plurality of images (e.g., plurality of images 302) to generate the plurality of templates (e.g., plurality of templates 304) by processing the plurality of images using a neural network. A template that is generated by a neural network may also be referred to as an embedding. An embedding may be generated for each image of the plurality of images. An embedding may generally include a numerical representation of the image that has been processed by the neural network. In some implementations, the numerical representation of the image may include one or more vectors of elements or values that represent the image. In some implementations, an embedding may include a single "n"-dimensional vector, where "n" is a number of elements. In this way, and as will be discussed in greater detail below, the plurality of templates (e.g., plurality of templates 304) may be compared against one another to generate a verified subset of templates (e.g., verified subset of templates 306) including the at least one template that verifies each template of the plurality of templates. In some implementations where the plurality of images include biometric identifiers, the plurality of templates generated by template selection process 10 may generally be referred to as "biometric templates".

In some implementations, template selection process 10 may verify 204 at least one template of the plurality of templates against at least one other template of the plurality of templates based upon, at least in part, a template quality threshold. In some implementations, verifying at least one template against at least one other template may generally include comparing the at least one template to the at least one other template relative to the template quality threshold. In some implementations, verifying the at least one template against the at least one other template may include verifying that the subject of the at least one template and the subject of the at least one other template is the same subject relative to a degree of certainty (e.g., the template quality threshold). As discussed above, template selection process 10 may assume that the subject in each of the plurality of images is the same and may verify each template against each other relative to the template quality threshold.

In some implementations, the template quality threshold may generally describe the similarity between the at least one template and the at least one other template and/or a degree of certainty to which one template can verify that the subject of another template is the same subject. In some implementations, the template quality threshold may be a value ranging from "0.0" to "1.0", where "0.0" may indicate low or no similarity between the at least one template and the at least one other template and/or a low probability that the subject in the at least one template and the subject in the at least one other template is the same subject and "1.0" may indicate high similarity between the at least one template and the at least one other template and/or a high probability that the subject in the at least one template and the subject in the at least one other template is the same subject. However, it will be appreciated that other ranges or metrics for the template quality threshold may be used within the scope of the present disclosure. In some implementations, the template threshold score may be used to reject and/or filter out one or more templates as poor or low quality (e.g., based upon, at least in part, a low degree of similarity between the filtered out template(s) and another template). As will be discussed in greater detail below and in some implementations, the template quality threshold may be reconfigured (e.g., increased or decreased) by template selection process 10.

Figure 4:
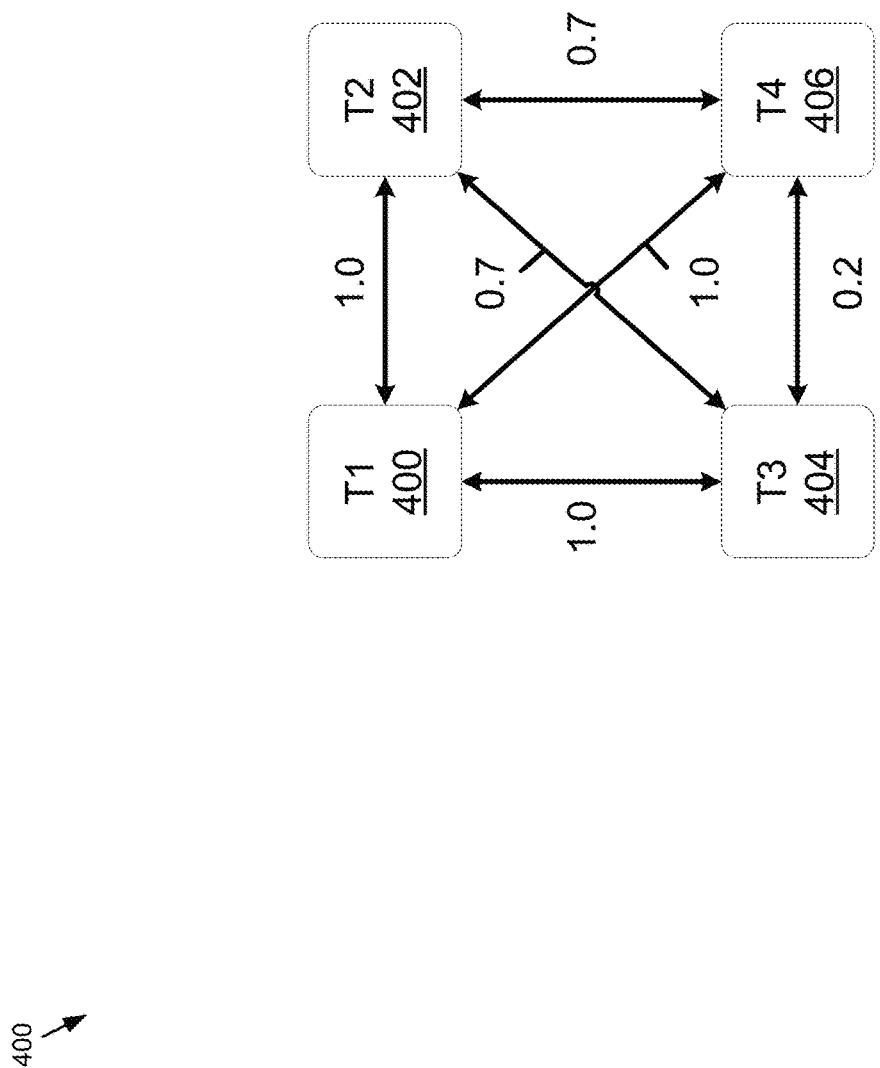
FIG. 4 is an example diagrammatic view of one or more templates and the match scores associated with the one or more templates according to one or more example implementations of the disclosure.

Referring also to the example of FIG. 4 and in some implementations, template selection process 10 may verify 204 at least one template (e.g., template T1 400) against at least one other template (e.g., template T2 402, template T3 404, and/or template T4 406). As will be discussed in greater detail below, template selection process 10 may verify one or more templates (e.g., template T1 400, template T2 402, template T3 404, and/or template T4 406) against one or more other templates (e.g., template T1 400, template T2 402, template T3 404, and/or template T4 406). In some implementations, template selection process 10 may verify 204 at least one template against each template of the plurality of templates.

In some implementations, verifying 204 the at least one template of the plurality of templates against at least one other template of the plurality of templates may include determining 208 a match score associated with the at least one template of the plurality of templates and the at least one other template of the plurality of templates. In some embodiments, the match score may indicate the closeness or similarity between the templates. In some implementations, the match score may be a value ranging from "0.0" to "1.0", where "0.0" may indicate low or no similarity between the at least one template and the at least one other template and "1.0" may indicate a high similarity between the at least one template and the at least one other template. It will be appreciated that other ranges or metrics for the match score may be used within the scope of the present disclosure. For example, a relatively high match score may indicate that one template is able to identify and/or verify that the other template includes the same subject with a high degree of certainty while a relatively low match score may indicate that one template is able to identify and/or verify that the other template includes the same subject with a low degree of certainty. As discussed above, template selection process 10 may verify at least template (e.g., template T1 400) against at least one other template (e.g., template T2 402, template T3 404, and/or template T4 406). In some implementations, template selection process 10 may determine a match score associated with the at least one template (e.g., template T1 400) and the at least one other template (e.g., template T2 402, template T3 404, and/or template T4 406) by utilizing a match function which is configured to compute the match score. In some implementations, the match function may include a dot product of the templates when the templates include vectors of scalar numbers. In some implementations, the match function may include the Hamming distance of the plurality of templates if they are vectors of bits. In some implementations, template selection process 10 may determine the match score associated with one or more pairs of templates of the plurality of templates.

Referring again to the example of FIG. 4 and in some implementations, template selection process 10 may determine 208 a match score of "1.0" between the at least one template (e.g., template T1 400) and the at least one other template (e.g., template T2 402, template T3 404, and/or template T4 406). In some implementations, template selection process 10 may determine: a match score of "1.0" between template T1 400 and template T3 404; a match score of "1.0" between template T1 400 and template T4 406; a match score of "0.7" between template T2 402 and template T3 404; a match score of "0.7" between template T2 402 and template T4 406; and/or a match score of "0.2" between template T3 404 and template T4 406. From at least the example match scores of FIG. 4, template selection process 10 may determine that template T1 400 may verify the subject in template T2 402 with "1.0" degree of certainty. Template selection process 10 may also determine that template T1 400 may verify the subject in template T3 404 with "1.0" degree of certainty and that template T1 400 may verify the subject in template T4 406 with "1.0" degree of certainty. In some implementations, template selection process 10 may record or otherwise store the match score associated with the at least one template and the at least one other template in a database, data store, and/or other storage device. In some implementations, template selection process 10 may record or otherwise store the match score associated with the at least one template and the at least one other template in a matrix, or other data structure, as shown below in Equation 1.

$$S = \begin{pmatrix} match_{11} & \cdots & match_{1k} \\ \vdots & \ddots & \vdots \\ match_{k1} & \cdots & match_{kk} \end{pmatrix} \quad (1)$$

where "S" is a similarity matrix, "k" is the number of templates in the plurality of templates, and "match$_{1_k}$" corresponds to the match score associated with the first template and the "k-th" template.

In some implementations, verifying 204 the at least one template of the plurality of templates against at least one other template of the plurality of templates may include initializing the template quality threshold to a predefined template quality threshold. In some implementations, template selection process 10 may initialize the template quality threshold to an initial template quality threshold associated with a high similarity (e.g., "1.0") between the at least one template and the at least one other template. Initializing the template quality threshold may generally include setting or defining the template quality threshold with an initial template quality threshold. As discussed above, the template quality threshold may generally define a degree of similarity between templates and/or a measure of the ability of at least one template to verify the subject in at least one other template. In some implementations, initializing the template quality threshold may include receiving the initial template quality threshold from a user (e.g., via a user interface) and/or may include setting or defining the template quality threshold to a default initial template quality threshold. As will be discussed in greater detail below, template selection process 10 may initialize the template quality threshold with a high initial template quality threshold (e.g., "1.0") to verify whether the at least one template and the at least one other template to are very similar and/or whether the at least one template can verify the subject of the at least one other template to a high degree of certainty. As will be discussed in greater detail below, template selection process 10 may generate the verified subset of templates (e.g., verified subset of templates 306) with a small subset of templates (e.g., one or more templates) that are highly similar and iteratively decrement the template quality threshold to add one or more templates that are less similar to the verified subset of templates based upon, at least in part, the template quality threshold. In this regard, in an embodiment, template selection process 10 may generate the verified subset of templates having the highest match (i.e., the greatest ability for one template to verify that the subject of another template is the same subject to a highest degree of likelihood), and may iteratively lower the template match (i.e., the degree of certainty to which one template can verify that the subject of another template is the same subject) to admit further templates into the verified subset of templates until a lower match threshold is reached and/or a target number of templates are included within the verified subset of templates.

In some implementations, template selection process 10 may initialize the template quality threshold to an initial template quality threshold associated with a low similarity (e.g., "0.0"). In some implementations, template selection process 10 may initialize the template quality threshold with a low initial template quality threshold (e.g., "0.0") to verify whether the at least one template and the at least one other template to are at least partially similar and/or whether the at least one template can verify the subject of the at least one other template to at least a low degree of certainty. As will be discussed in greater detail below, template selection process 10 may generate the verified subset of templates (e.g., verified subset of templates 306) with each of the templates of the plurality of templates and iteratively increment the template quality threshold to filter out one or more templates that are less similar to the verified subset of templates based upon, at least in part, the template quality threshold.

In some implementations, verifying 204 the at least one template of the plurality of templates against at least one other template of the plurality of templates may include comparing the match score associated with the one or more templates with the template quality threshold. For example, template selection process 10 may initialize the template quality threshold to an initial template quality threshold of "1.0". In some implementations, template selection process 10 may verify the at least one template (e.g., template T1 400) against the at least one other template (e.g., template T2 402, template T3 404, and/or template T4 406) based upon, at least in part, the template quality threshold (e.g., "1.0"). In some implementations, template selection process 10 may verify template T1 400 against template T2 402, template T3 404, template T4 406 because the match score associated with template T1 400 and each of template T2 402, template T3 404, template T4 406 (e.g., "1.0") is greater than or equal to the template quality threshold (e.g., "1.0"), which may indicate a high likelihood that the subject of template T1 400 is the same as the subject of template T2 402, template T3 404, and/or template T4 406. In some implementations, template selection process 10 may verify template T2 402 against template T1 400 because the match score associated with template T2 402 and template T1 400 (e.g., "1.0") is greater than or equal to the template quality threshold (e.g., "1.0") and/or may not verify template T2 402 against template T3 404 and/or template T4 406 because the match score associated with template T2 402 and template T3 404 and/or template T4 406 (e.g., "0.7" and "0.5", respectively) is less than the template quality threshold (e.g., "1.0"). As such, template T1 400 and template T2 402 may verify each other based upon, at least in part, the template quality threshold (e.g., "1.0"). In some implementations, template T1 400 may verify all other templates for the given template quality threshold (e.g., "1.0").

In some implementations, template selection process 10 may generate 206 a verified subset of templates including the at least one template that verifies each template of the plurality of templates. As discussed above, template selection process 10 may generally generate and/or select a subset or sub-track of templates that is most likely to result in the correct identification of the identity of the subject and/or the correct verification of the identity of the subject for a given template quality threshold. Returning to the above example of FIG. 4, template selection process 10 may generate 206 a verified subset of templates (e.g., verified subset of templates 306) including the at least one template that verifies each template of the plurality of templates (e.g., template T1 400, template T2 402, template T3 404, and/or template T4 406). In some implementations, generating 206 the verified subset of templates including the at least one template that verifies each template of the plurality of templates may be based upon, at least in part, the template quality threshold. For example and as discussed above, template selection process 10 may verify the at least one template (e.g., template T1 400) against each template of the plurality of templates (e.g., template T2 402, template T3 404, and template T4 406) based upon, at least in part, the template quality threshold (e.g., "1.0"). As will be discussed in greater detail below, because template selection process 10 may determine that template T1 400 verifies each of template T2 402, template T3 404, and template T4 406 based upon, at least in part, the template quality threshold (e.g., "1.0"), template selection process 10 may generate the verified subset of templates (e.g., verified subset of templates 306) to include template T1 400. In some implementations, generating the verified set of templates may be represented by Equation 2, provided below.

$$T_{sub} = \{T_i \in T | U_{j=1}^k \{S_{ij} : i \neq j, S_{ij} < t\} = \emptyset\} \quad (2)$$

where "$T_{sub}$" may be the subset of templates, "$T_i$" may be the "i-th" template of the plurality of templates, "T", "$U_{j=1}^k$" may be the union of elements of a similarity matrix (see Equation 1), where "$S_{ij}$" is the entry in the "i-th" column and "j-th" row of the similarity matrix, and "t" is the template quality threshold.

As can be seen from at least Equation 2, template selection process 10 may process each template separately when generating the verified subset of templates. For example, template selection process 10 may determine whether "$T_i$" should be added or admitted to the verified subset of templates. Template selection process 10 may begin with any template of the plurality of templates. In some implementations, the "i-th" template of the plurality of templates may start with the first template and proceed sequentially through the track. In some implementations, the "i-th" template may be randomly selected and/or may be selected by a user (e.g., via a user interface). As shown above in Equation 2 and as will be discussed in greater detail below, template selection process 10 may add or admit "$T_i$" if its set of failed verifications is empty. In other words, each match score associated with "$T_i$" may be compared against the template quality threshold. The match scores that are less than the template quality threshold may be counted as failed verifications for the given template quality threshold. In some implementations, the verified subset of templates may include the at least one template that never fails to verify each template (e.g., when the set of failed verifications of Equation 2 for a template is empty).

In some implementations, generating 206 the verified subset of templates may include adding 210 one or more templates to the verified subset of templates based upon, at least in part, the match score associated with the at least one template of the plurality of templates and the at least one other template and the template quality threshold. In some implementations and as discussed above, template selection process 10 may initialize the template quality threshold to "1.0". Template selection process 10 may generate 206 the verified subset of templates by adding 210 one or more templates to the verified subset based upon, at least in part, the match score associated with the at least one template and the at least one other template and the template quality threshold. For example and as discussed above, template selection process 10 may determine whether template T1 400 should be added to the verified subset of templates by comparing the match scores associated with template T1 400 and each other template (e.g., template T2 402, template T3 404, and template T4 406) (e.g., "1.0", "1.0", and "1.0", respectively) to the template quality threshold (e.g., "1.0). As discussed above, template selection process 10 may add 210 template T1 400 to the verified subset of templates because template T1 400 verifies each template (e.g., template T2 402, template T3 404, and template T4 406) for the template quality threshold (e.g., "1.0").

In some implementations, template selection process 10 may generate the verified subset of templates to include a minimum number of templates. In some implementations, the minimum number of templates and/or target number of templates may be user-defined and received via a user input and/or may be a default minimum number of templates (e.g., at least one template). As generally discussed above, in some embodiments, this may include iteratively verifying the templates at decreasing match scores until the minimum number of templates has been added to the verified subject of templates. In some implementations, the determination of the minimum number of templates may be based upon, at least in part, a trade-off or balance between available storage space and track quality.

In some implementations, generating 206 the verified subset of templates may be based upon, at least in part, a minimum template quality threshold. A minimum template quality threshold, a, may be chosen which marks a minimum quality of sub-track which template selection process 10 may accept to search with. In some implementations, the minimum template quality threshold may be the intersection point of a Receiver Operator Characteristic (e.g., ROC) curve (e.g., the match-score which is as likely to produce a false positive (e.g., FP) match as false negative (e.g., FN) match on a given test database). In some implementations of ROC curve analysis, a true positive rate may be plotted against the false positive rate at various threshold settings. An area of "100%" under the curve may represent a perfect test. In some implementations, the minimum template quality threshold may be user-defined (e.g., received via a user interface) and/or may be default minimum template quality threshold associated with template selection process 10.

In some implementations, template selection process 10 may determine whether the verified subset of templates (e.g., verified subset of templates 306) includes at least the minimum number of templates. In some implementations, template selection process may determine whether the template quality threshold is less than the minimum template quality threshold. As will be discussed in greater detail below and in some implementations, the template quality threshold may be decreased and/or decremented to include at least the minimum number of templates. In some implementations, when template selection process 10 determines that one or more of the template quality threshold is less than the minimum template quality threshold and/or the verified subset of templates (e.g., verified subset of templates 306) includes at least the minimum number of templates, template selection process 10 may provide or generate the verified subset of templates (e.g., verified subset of templates 306). In some implementations, when template selection process 10 determines that one or more of the template quality threshold is greater than the minimum template quality threshold and/or the verified subset of templates does not include at least the minimum number of templates, template selection process 10 may decrease or decrement the template quality threshold by a predefined step-size (e.g., 0.01). In some implementations, the predefined step-size may be user-defined (e.g., received via a user interface) and/or may be default step-size associated with template selection process 10.

Returning to the example of FIG. 4, suppose (e.g., for example purposes only) that the predefined step-size is "0.3", the minimum number of templates is "1", and the minimum template quality threshold is "0.5". In some implementations, template selection process 10 may determine whether the number of templates in the verified subset of templates is greater than or equal to the minimum number of templates. In this example, the number of templates in the verified subset of templates (e.g., "1") is equal to the minimum number of templates (e.g., "1"). As such, template selection process 10 may generate or yield the verified subset of templates including just template T1 400 for searching against the at least one database template.

In another illustrative example, suppose (e.g., for example purposes only) the minimum number of templates is changed to two. Template selection process 10 may determine that the number of templates in the verified subset of templates is not greater than or equal to the minimum number of templates. In some implementations, template selection process 10 may add 210 template T2 402 to the verified subset of templates because template T2 402 verifies template T1 400.

As discussed above, template selection process 10 may determine whether the number of templates in the verified subset of templates is greater than or equal to the minimum number of templates. In this example, the number of templates in the verified subset of templates (e.g., "2") is equal to the minimum number of templates (e.g., "2"). As such, template selection process 10 may generate or yield the verified subset of templates including template T1 400 and template T2 402 for searching against the at least one database template.

In some implementations, template selection process 10 may determine that the number of templates in the verified subset of templates is less than the minimum number of templates. In some implementations, template selection process 10 may decrement or reduce the template quality threshold by the predefine step-size (e.g., decrement from "1.0" to "0.7") to generate an updated template quality threshold. Template selection process 10 may determine whether the updated template quality threshold is less than the minimum template quality threshold. If the template quality threshold is less than the minimum quality threshold (e.g., "0.5") may generate or yield the verified subset of templates for searching against the at least one database template. In this example, because the updated template quality threshold (e.g., "0.7") is not less than the minimum template quality threshold (e.g., "0.5"), template selection process 10 may compare the match score associated with the one or more templates with the updated template quality threshold.

For example, template selection process 10 may verify template T1 400 and T2 402 against each of the templates because the match score (as discussed above) between each of template T1 400 and each template in the plurality of templates and template T2 402 and each template in the plurality of templates is greater than or equal to the template quality threshold (e.g., "0.7"). However, template selection process 10 may not verify template T3 404 and template T4 406 against each of the templates because the match score associated with template T3 404, template T4 406, and each of the plurality of templates is less than the template quality threshold (e.g., "0.7"). In some implementations, template selection process 10 may regenerate the verified subset of templates by adding one or more templates (e.g., template T1, 400 and template T2 402) as a regenerated verified subset of templates (e.g., verified subset of templates 306) based upon, at least in part, the updated template quality threshold (e.g., "0.7").

In some implementations, template selection process may repeat the above-described decrementing of the template quality threshold and regenerating of verified subset of templates by adding 210 of one or more templates to the verified subset of templates until one or more of the template quality threshold is less than the minimum template quality threshold and/or the verified subset of templates includes at least the minimum number of templates.

Figure 5:
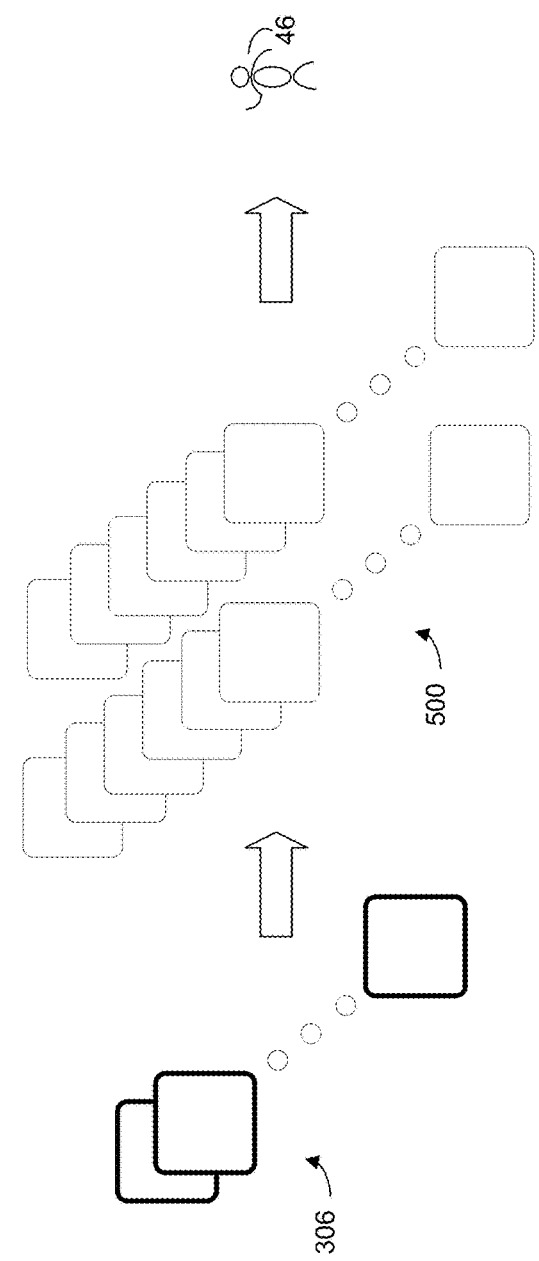
FIG. 5 is an example diagrammatic view of the comparison of a verified subset of templates to at least one database template according to one or more example implementations of the disclosure.

Referring also to FIG. 5 and in some implementations, template selection process 10 may compare 212 the verified subset of templates to at least one database template. In some implementations, the verified subset of templates (e.g., verified subset of templates 306) that is used to search a database may generally be referred to as a "probe". As discussed above, template selection process 10 may generate verified subset of templates (e.g., verified subset of templates 306) representative of the plurality of images. In some implementations, template selection process 10 may compare the verified subset of templates (e.g., verified subset of templates 306) to at least one database template (e.g., database template 500). A database template may generally refer to a pre-defined template of a subject. In some implementations, the at least one database template (e.g., database template 500) may be accessible to computing device 12 during execution of a visual identification application and/or a visual verification application within a visual identification system and/or a visual verification system. In some implementations, the at least one database template (e.g., database template 500) may be stored in a storage device accessible to computing device 12 (e.g., storage device 16). In some implementations, the at least one database template (e.g., database template 500) may be stored in a "cloud-based" storage system accessible to computing device 12. In some implementations, the at least one database template (e.g., database template 500) may include at least one fused template.

In some implementations, at least a portion of the verified subset of templates may be fused to form a fused subset of verified templates. For example, template selection process 10 may compare 212 the fused verified subset of templates to at least one database template. In some implementations, the fused verified subset of templates may provide a higher probability of identifying and/or verifying the subject and/or a greater processing efficiency than comparing each template of the verified subset of templates individually against the at least one database template and/or by fusing the plurality of templates together. As such, the verified subset of templates may include a set of templates that may be preferred or ideal for fusing.

In some implementations and as discussed above, the plurality of images received by template selection process 10 may include low quality images. In some implementations, template selection process 10 may utilize self-verification (e.g., generating the verified subset of templates that that verify each other). As such, template selection process 10 may generate and/or select a subset of templates to use in a database search that represent the best samples of the subject despite the plurality of images including low quality images.

In some implementations, comparing 212 the verified subset of templates to the at least one database template may include comparing 214 the verified subset of templates to the at least one database template to identify a subject in the plurality of images of the subject from a plurality of subjects identified in the at least one database template. In some implementations, the at least one database template may include a plurality of database templates associated with a plurality of subjects. The plurality of database templates may be associated with known subjects, such that a visual identification system may identify a subject by comparing the received plurality of images to the plurality of database templates. In some implementations, template selection process 10 may generate a verified subset of templates (e.g., verified subset of templates 306) of user 46 based upon, at least in part, receiving a plurality of images of user 46. Template selection process 10 may compare the verified subset of templates (e.g., verified subset of templates 306) to at least one database template to determine whether or not the identity of the subject (e.g., user 46) can be determined from the plurality of images using the plurality of database templates (e.g., database template 500). While the above example describes identifying the subject from the plurality of images as a known subject (e.g., user 46), template selection process 10 may compare the verified subset of templates (e.g., verified subset of templates 306) to the at least one database template (e.g., database template 500) to identify any subject (e.g., any object such as a road sign, a vehicle, a tattoo, or any other object) in the plurality of images of the subject is the subject (e.g., an object such as a road sign, a vehicle, a tattoo, etc.) identified in the at least one database template.

In some implementations, comparing 212 the verified subset of templates to the at least one database template may include comparing 216 the verified subset of templates to the at least one database template to verify whether the subject in the plurality of images of the subject is the subject identified in the at least one database template. In some implementations, the at least one database template may include a plurality of database templates associated with a plurality of subjects. In some implementations, the at least one database template may include a database template associated with a particular subject. In some implementations, a visual verification system may verify a subject by comparing the verified subset of templates (e.g., verified subset of templates 306) to the at least one database template to verify that the subject in the plurality of images is the subject of the at least one database template. In some implementations, template selection process 10 may generate a verified subset of templates (e.g., verified subset of templates 306) of user 46 based upon, at least in part, receiving a plurality of images of user 46. Template selection process 10 may compare the verified subset of templates (e.g., verified subset of templates 306) to the at least one database template (e.g., database template 500) to determine whether or not the subject of the plurality of images (e.g., user 46) can be verified to be the subject of the at least one database template (e.g., database template 500). While the above example describes verifying that subject of the plurality of images is an individual (e.g., user 46), template selection process 10 may compare verified subset of templates (e.g., verified subset of templates 306) to the at least one database template to verify whether the subject (e.g., an object such as a road sign, a vehicle, a tattoo, or any other object) in the plurality of images of the subject is the subject (e.g., an object such as a road sign, a vehicle, a tattoo, or any other object) identified in the at least one database template.

In some implementations, template selection process 10 may be utilized in a facial recognition system to permit user 46 to access a secure area in user 46's office, or other access control situations. In some implementations, user 46's identity may be verified by enrolling a first plurality of images of user 46's face in to a database. As described above, template selection process 10 may generate a verified subset of templates (e.g., verified subset of templates 306) from the plurality of received images. In some implementations, the first plurality of images of user 46 may be used to generate at least one database template associated with user 46. Subsequently, user 46 may attempt to access the secure area in user 46's office. A camera system (e.g., camera system 46) may capture a second plurality of images of user 46's face. As described above, template selection process 10 may generate a verified subset of templates associated with the second plurality of images. Template selection process 10 may compare the verified subset of templates with the at least one database template to verify that the face captured in the second plurality of images belongs to user 46. While facial recognition has been described, any biometric identifier (e.g., fingerprint, retina of the eye, iris of the eye, footprint, etc.) may be used within the scope of the present disclosure.

Figure 6A:
FIGS. 6A and 6B are example images from a face dataset that may be used with template selection process example implementations of the disclosure.
Figure 6B:
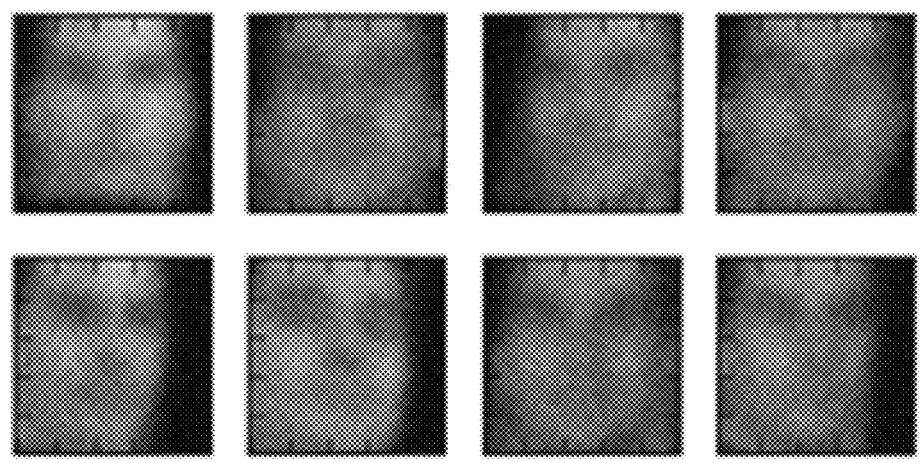

Referring also to FIGS. 6A and 6B, in an illustrative experimental example a face dataset of images of fifty identities (e.g., the Georgia Tech face dataset) was received by template selection process 10. As shown in FIGS. 6A and 6B, each image of the face dataset was blurred using a standard Gaussian filter (e.g., G=3). In this example, a database was generated with two images for each identity. The face dataset included fifty "12-tracks" or one "12-track" per identity. As shown below in Table 1, three tests were performed. In Table 1 below, the row labelled "Baseline" represents a standard search where every image in the track is used to probe or search the database, and the maximum match-score (using cosine similarity) is used to verify/identify. The rows labelled "Template Selection Process" represent template selection process 10 and the value of "r" may represent the number of templates in the verified subset of templates. The row labelled "Random" represents selecting one image at random from the track to search the database. The rows labelled "Representative" may utilize the approach discussed in Jain, A., Uludag, U., Ross, A.: Biometric Template Selection: A Case Study in Fingerprints. In: Proc. 4th Int.l Conf. Audio- and Video-based Biometric Person Authentication, pp. 335-342 (2003), by selecting the top "N" representative samples from the track in multiple sub-tests.

The column "ROC Area" represents the accuracy of a test as measured by the area under the Receiver Operator Characteristic (ROC) curve from ROC curve analysis. In ROC curve analysis, a true positive rate is plotted against the false positive rate at various threshold settings. An area of "100%" under the curve represents a perfect test. The column "CMC %" represents a cumulative match curve. To generate the cumulative match curve, each probe is compared against all samples (e.g., in a database). The resulting scores are sorted and ranked. The cumulative match curve determines the rank at which a true match occurs. In other words, the "CMC %" may describe the probability of observing the correct identity within a given number of ranks. The column "Comparisons during Search (x improvement)" represents number of comparisons of templates conducted during the search and a multiplier (e.g., "12×") to indicate the reduction in the number of comparisons conducted by template selection process 10 compared to the "Baseline".

| | ROC Area (%)[5] | CMC % (Ranks = 1, 2, 3)[6] | Comparisons during Search (x improvement) |
|---|---|---|---|
| Baseline | 98.3 | 92, 94, 96 | 1200 |
| Template Selection Process (r = 1) | 97.6 | 86, 96, 96 | 100 (12×) |
| Template Selection Process (r = 2) | 97.9 | 90, 98, 98 | 200 (6×) |
| Template Selection Process (r = 3) | 98.2 | 90, 96, 98 | 300 (4×) |
| Random | 89.5 | 66, 72, 75 | 100 |
| Representative (N = 1) | 93.2 | 82, 86, 86 | 100 |
| Representative (N = 2) | 94.1 | 84, 86, 86 | 200 |
| Representative (N = 3) | 94.6 | 88, 88, 88 | 300 |

As can be seen from Table 1, template selection process 10 demonstrates a reduction in the number of comparisons required during a search when compared to the "Baseline" test, the "Random" test, and the "Representative" tests. In some implementations, the reduced number of comparisons during searching may increase the speed and/or efficiency of database searches in visual identification systems and/or visual verification systems. For example, template selection process 10 may demonstrate improved search-time cost (e.g., a 6×-12× reduction in searches) on small tracks, with only negligible degradation of search performance on a sample database.

In some implementations utilizing template selection process 10, it may be observed that the verified subset of templates may be generated by self-verification (e.g., generating the verified subset of templates that verify each template of the plurality of templates relative to a template quality threshold). As opposed to comparing templates against an arbitrary standard or metric that may be used by conventional systems, template selection process 10 may verify one or more templates against each of the plurality of templates to generate a verified subset of templates. In some implementations, template selection process 10 may filter out bad samples from the plurality of templates by generating the subset of templates based upon, at least in part, the template quality threshold. As discussed above, template selection process 10 may be useful in challenging environments where a subject appears from a distance and/or with substantial amounts of blur and/or occlusion by generating a verified subset of templates (e.g., good samples).

Figure 7:
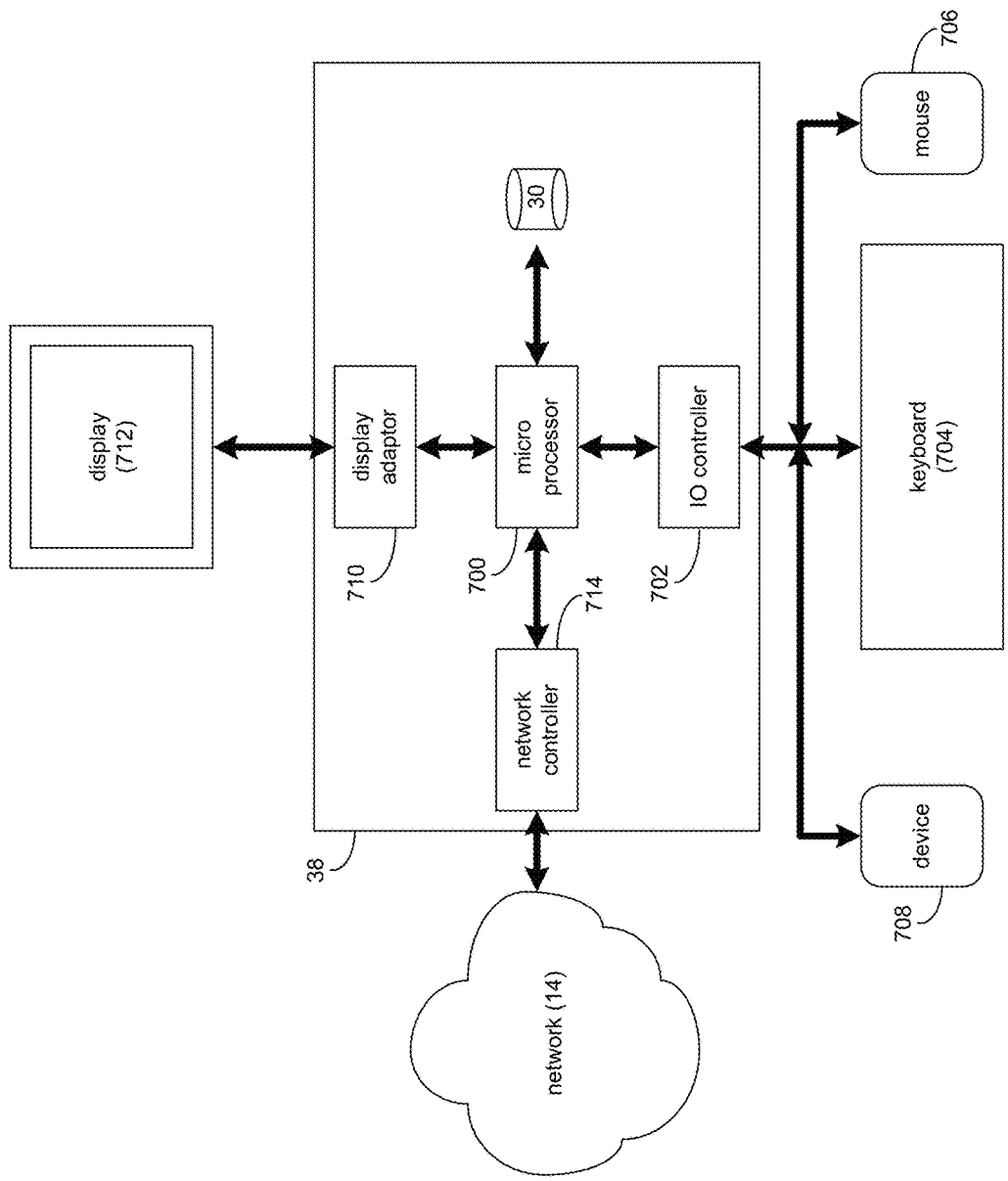
FIG. 7 is an example diagrammatic view of a client electronic device of FIG. 1 according to one or more example implementations of the disclosure.

Referring also to FIG. 7, there is shown a diagrammatic view of client electronic device 38. While client electronic device 38 is shown in this figure, this is for illustrative purposes only and is not intended to be a limitation of this disclosure, as other configurations are possible. For example, any computing device capable of executing, in whole or in part, template selection process 10 may be substituted for client electronic device 38 within FIG. 7, examples of which may include but are not limited to computing device 12 and/or client electronic devices 40, 42, 44.

Client electronic device 38 may include a processor and/or microprocessor (e.g., microprocessor 700) configured to, e.g., process data and execute the above-noted code/instruction sets and subroutines. Microprocessor 700 may be coupled via a storage adaptor (not shown) to the above-noted storage device(s) (e.g., storage device 30). An I/O controller (e.g., I/O controller 702) may be configured to couple microprocessor 200 with various devices, such as keyboard 704, pointing/selecting device (e.g., mouse 706), custom device (e.g., device 708), USB ports (not shown), and printer ports (not shown). A display adaptor (e.g., display adaptor 710) may be configured to couple display 712 (e.g., CRT or LCD monitor(s)) with microprocessor 700, while network controller/adaptor 714 (e.g., an Ethernet adaptor) may be configured to couple microprocessor 700 to the above-noted network 14 (e.g., the Internet or a local area network).

Figure 8:
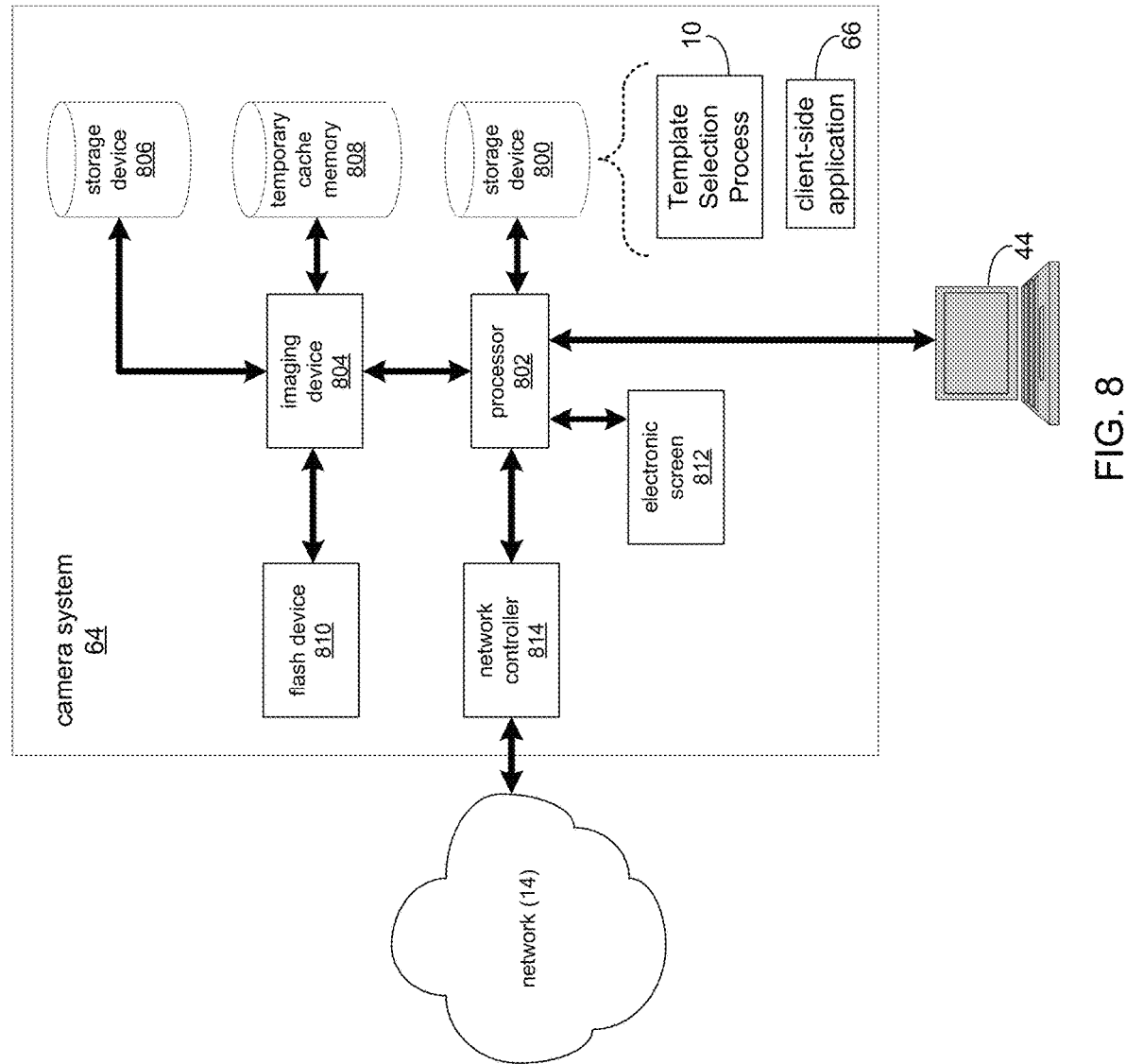
FIG. 8 is an example diagrammatic view of a camera system of FIG. 1 according to one or more example implementations of the disclosure.

Referring also to FIG. 8, there is shown a diagrammatic view of an image or video capturing device (e.g., camera system 64). Camera system 64 may include, for example, a chemical film based camera, a digital camera, a video camera, a web camera, and a camera phone. The instruction sets and subroutines of template selection process 10, which may be stored on storage device 800 coupled to camera system 64, may be executed by one or more processors, (e.g., processor 802) and one or more memory architectures incorporated into camera system 12. Storage device 800 may include but is not limited to: a hard disk drive; a tape drive; an optical drive; a RAID array; a random access memory (RAM); a read-only memory (ROM); compact flash (CF) storage devices; secure digital (SD) storage devices; and memory stick storage devices.

Camera system 64 may include imaging device 804 configured to take one or more pictures of one or more objects within a viewing field of imaging device 804. As mentioned above, camera system 64 may include, for example, a chemical film based camera, a digital camera, a video camera, a web camera and a camera phone. As such, imaging device 804 may include, but is not limited to, a chemical film based imaging device (e.g., which may be capable of capturing an image on one or more frames of chemical based photographic film, or a photographic plate), and a digital imaging device, such, but not limited to, a charge coupled device (CCD) or a complementary metal-oxide-semiconductor (CMOS) sensor capable of image capture. Imaging device 804, which may include a chemical film based imaging device and/or a digital imaging device may be configured as a video imaging device, e.g., which may be capable of capturing a sequence of still images that may be capable or representing scenes in motion.

Imaging device 804 may include a shutter mechanism and may be coupled to one or more of storage devices 806, 808 configured to store pictures taken by camera system 64. Storage device 804 may include, but is not limited to, a chemical film based storage device (e.g., including one or more frames of chemical based photographic film and/or a photographic plate), and an electronic storage device (e.g., a hard disk drive, a tape drive, an optical drive, a RAID array, a random access memory, a read only memory, compact flash (CF) storage devices, secure digital (SD) storage devices, and memory stick storage devices). Camera system 64 may include one or more lenses, an auto-focusing mechanism, and a range-finding mechanism, which may be coupled to imaging device 804. Imaging device 804 may be coupled to processor 802, and may be configured to send one or more signals to imaging device 804 for triggering imaging device 804 to take one or more pictures.

Imaging device 804 may include a flash device 810. Upon determining that a detected light level (e.g., as detected with a photocell) is below a predefined threshold light level, imaging device 804 may provide flash illumination by triggering flash device 810. When triggered, flash device 810 may provide the necessary illumination to achieve a light level equal to, or above, the predefined threshold light level. Once properly illuminated, imaging device 804 may take one or more pictures of an object illuminated by flash device 810.

Camera system 64 may include electronic screen 812. Electronic screen 812 may be a display screen used as a view finder or for displaying the viewing field of the camera. Camera system 64 may generate a live preview of the viewing field of camera system 64 by means of continuously and directly projecting the image formed by the lens of camera system 64 onto a main image sensor that feeds electronic screen 812 with the live preview image of the viewing field of the camera. Electronic screen 812 may be a liquid crystal display (LCD) or an electronic viewfinder. Additionally, network controller/adaptor 814 (e.g., an Ethernet adaptor) may be configured to couple processor 802 to the above-noted network 14 (e.g., the Internet or a local area network). In some implementations, processor 802 may include one or more IO ports to directly connect (e.g., via a cable) to a computing device (e.g., client device 44). Once connected to a computing device, template selection process 10 may import or otherwise receive the plurality of images from camera system 64.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method, executed on a computing device, comprising:
    receiving, at the computing device, a plurality of images of a subject;
    processing the plurality of images of the subject to generate a plurality of templates, based at least in part on one or more biometric identifiers comprising one or more physiological characteristics that are related to a shape or configuration of a body or portions of the body, wherein each of the plurality of templates corresponds to a representation of the subject that is generated by an object recognition system;
    verifying at least one template of the plurality of templates against at least one other template of the plurality of templates based upon, at least in part, a template quality threshold; and
    generating a verified subset of templates including the at least one template that verifies each template of the plurality of templates.

2. The computer-implemented method of claim 1, wherein verifying the at least one template of the plurality of templates against at least one other template of the plurality of templates includes:
    determining a match score associated with the at least one template of the plurality of templates and the at least one other template of the plurality of templates.

3. The computer-implemented method of claim 2, wherein generating the verified subset of templates includes:
    adding one or more templates to the verified subset of templates based upon, at least in part, the match score associated with the at least one template of the plurality of templates and the at least one other template and the template quality threshold.

4. The computer-implemented method of claim 1, wherein generating the verified subset of templates is based upon, at least in part, a minimum template quality threshold.

5. The computer-implemented method of claim 1, further comprising:
    comparing the verified subset of templates to at least one database template.

6. The computer-implemented method of claim 5, wherein comparing the verified subset of templates includes:
    comparing the verified subset of templates to at least one database template to identify the subject in the plurality of images of the subject from a plurality of subjects identified in the at least one database template.

7. The computer-implemented method of claim 5, wherein comparing the verified subset of templates includes:
    comparing the verified subset of templates to at least one database template to verify whether the subject in the plurality of images of the subject is the subject identified in the at least one database template.

8. A computer program product residing on a non-transitory computer readable medium having a plurality of instructions stored thereon which, when executed across one or more processors, causes at least a portion of the one or more processors to perform operations comprising:
    receiving a plurality of images of a subject;
    processing the plurality of images of the subject to generate a plurality of templates, based at least in part on one or more biometric identifiers comprising one or more physiological characteristics that are related to a shape or configuration of a body or portions of the body, wherein each of the plurality of templates corresponds to a representation of the subject that is generated by an object recognition system;
    verifying at least one template of the plurality of templates against at least one other template of the plurality of templates based upon, at least in part, a template quality threshold; and
    generating a verified subset of templates including the at least one template that verifies each template of the plurality of templates.

9. The computer program product of claim 8, wherein verifying the at least one template of the plurality of templates against at least one other template of the plurality of templates includes:
    determining a match score associated with the at least one template of the plurality of templates and the at least one other template of the plurality of templates.

10. The computer program product of claim 9, wherein generating the verified subset of templates includes:
    adding one or more templates to the verified subset of templates based upon, at least in part, the match score associated with the at least one template of the plurality of templates and the at least one other template and the template quality threshold.

11. The computer program product of claim 8, wherein generating the verified subset of templates is based upon, at least in part, a minimum template quality threshold.

12. The computer program product of claim 8, further comprising instructions for: comparing the verified subset of templates to at least one database template.

13. The computer program product of claim 12, wherein comparing the verified subset of templates includes:
comparing the verified subset of templates to a plurality of database templates to identify the subject in the plurality of images of the subject from a plurality of subjects identified in the plurality of database templates.

14. The computer program product of claim 12, wherein comparing the verified subset of templates includes:
comparing the verified subset of templates to at least one database template to verify whether the subject in the plurality of images of the subject is the subject identified in the at least one database template.

15. A computing system comprising one or more processors and one or more memories, wherein the computing system is configured to perform operations comprising:
receiving a plurality of images of a subject;
processing the plurality of images of the subject to generate a plurality of templates, based at least in part on one or more biometric identifiers comprising one or more physiological characteristics that are related to a shape or configuration of a body or portions of the body, wherein each of the plurality of templates corresponds to a representation of the subject that is generated by an object recognition system;
verifying at least one template of the plurality of templates against at least one other template of the plurality of templates based upon, at least in part, a template quality threshold; and
generating a verified subset of templates including the at least one template that verifies each template of the plurality of templates.

16. The computing system of claim 15, wherein verifying the at least one template of the plurality of templates against at least one other template of the plurality of templates includes:
determining a match score associated with the at least one template of the plurality of templates and the at least one other template of the plurality of templates.

17. The computing system of claim 16, wherein generating the verified subset of templates includes:
adding one or more templates to the verified subset of templates based upon, at least in part, the match score associated with the at least one template of the plurality of templates and the at least one other template and the template quality threshold.

18. The computing system of claim 15, wherein generating the verified subset of templates is based upon, at least in part, a minimum template quality threshold.

19. The computing system of claim 15, wherein the operations further comprise: comparing the verified subset of templates to at least one database template.

20. The computing system of claim 19, wherein comparing the subset of templates includes:
comparing the verified subset of templates to a plurality of database templates to identify the subject in the plurality of images of the subject from a plurality of subjects identified in the plurality of database templates.

* * * * *